US008918666B2

(12) United States Patent
Bauernfeind et al.

(10) Patent No.: US 8,918,666 B2
(45) Date of Patent: *Dec. 23, 2014

(54) APPARATUS FOR SYNCHRONIZING A DATA HANDOVER BETWEEN A FIRST AND SECOND CLOCK DOMAIN THROUGH FIFO BUFFERING

(75) Inventors: Thomas Bauernfeind, Arbing (AT); Stephan Henzler, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 530 days.

This patent is subject to a terminal disclaimer.

(21) Appl. No.: 13/113,730

(22) Filed: May 23, 2011

(65) Prior Publication Data

US 2012/0303994 A1 Nov. 29, 2012

(51) Int. Cl.
*H04L 7/00* (2006.01)
(52) U.S. Cl.
CPC .............. *H04L 7/005* (2013.01); *H04L 7/0012* (2013.01)
USPC .......................................... 713/400; 713/600
(58) Field of Classification Search
USPC ......... 713/1, 2, 100, 300, 310, 320, 321, 322, 713/323, 324, 330, 340, 375, 400, 401, 500, 713/501, 502, 503, 600, 601
See application file for complete search history.

(56) References Cited

U.S. PATENT DOCUMENTS

| | | | | |
|---|---|---|---|---|
| 5,263,057 A | * | 11/1993 | Nawrocki et al. | 375/372 |
| 5,513,224 A | * | 4/1996 | Holt | 375/372 |
| 6,249,875 B1 | * | 6/2001 | Warren | 713/400 |
| 6,396,853 B1 | * | 5/2002 | Humphrey et al. | 370/535 |
| 7,315,600 B2 | | 1/2008 | Sigurdsson et al. | |
| 7,366,943 B1 | | 4/2008 | Owen | |
| 7,498,957 B2 | | 3/2009 | De Buys | |
| 2002/0196886 A1 | | 12/2002 | Adkisson | |

(Continued)

FOREIGN PATENT DOCUMENTS

| | | |
|---|---|---|
| DE | 102005018858 B4 | 9/2009 |
| DE | 102009008092 A1 | 8/2010 |
| EP | 1263161 A1 | 12/2002 |
| WO | 2004013964 A2 | 2/2004 |

OTHER PUBLICATIONS

International Search Report and Written Opinion dated Sep. 5, 2012 for International Application No. PCT/EP2012/059631. 11 Pages.
U.S. Appl. No. 13/113,340, filed May 23, 2011. 38 Pages.

(Continued)

*Primary Examiner* — Kim Huynh
*Assistant Examiner* — Paul J Yen
(74) *Attorney, Agent, or Firm* — Eschweiler & Associates, LLC

(57) ABSTRACT

An apparatus for synchronizing a data handover between a first clock domain and a second clock domain includes a calculator, a first-in-first-out storage, a synchronization pulse generator, a fill level information provider and a feedback path. The calculator is configured to provide a synchronization pulse cycle duration information describing a temporal position of synchronization pulses at a clock of the second clock domain. The first-in-first-out storage receives an input data value in synchronization with the first clock domain and provides an output data value in synchronization with the second clock domain in response to a current synchronization pulse. The fill level information provider provides fill level information describing a fill level of the FIFO. The feedback path feeds back the fill level information to the calculator to adjust the synchronization pulse cycle duration information.

26 Claims, 12 Drawing Sheets

(56) References Cited

U.S. PATENT DOCUMENTS

| | | |
|---|---|---|
| 2002/0199124 A1 | 12/2002 | Adkisson |
| 2003/0081713 A1 | 5/2003 | Pontius et al. |
| 2003/0174795 A1* | 9/2003 | Bruhnke et al. ............. 375/354 |
| 2004/0223516 A1 | 11/2004 | Adkisson et al. |
| 2004/0223570 A1* | 11/2004 | Adkisson ...................... 375/359 |
| 2005/0041691 A1* | 2/2005 | Laufer et al. ................. 370/503 |
| 2006/0017472 A1 | 1/2006 | Adkisson |
| 2006/0023819 A1 | 2/2006 | Adkisson et al. |
| 2006/0023820 A1 | 2/2006 | Adkisson et al. |
| 2006/0190756 A1* | 8/2006 | Okamura ...................... 713/503 |
| 2006/0250287 A1 | 11/2006 | Menkhoff et al. |
| 2009/0193285 A1* | 7/2009 | Lutscher ...................... 713/600 |
| 2010/0057821 A1 | 3/2010 | Menkhoff |

OTHER PUBLICATIONS

Office Action dated Aug. 26, 2013 for U.S. Appl. No. 13/113,340.
German Office Action dated Jun. 30, 2014 for German Application No. 11 2012 002 232.7.
Notice of Allowance Dated Apr. 30, 2014 U.S. Appl. No. 13/113,340.

* cited by examiner

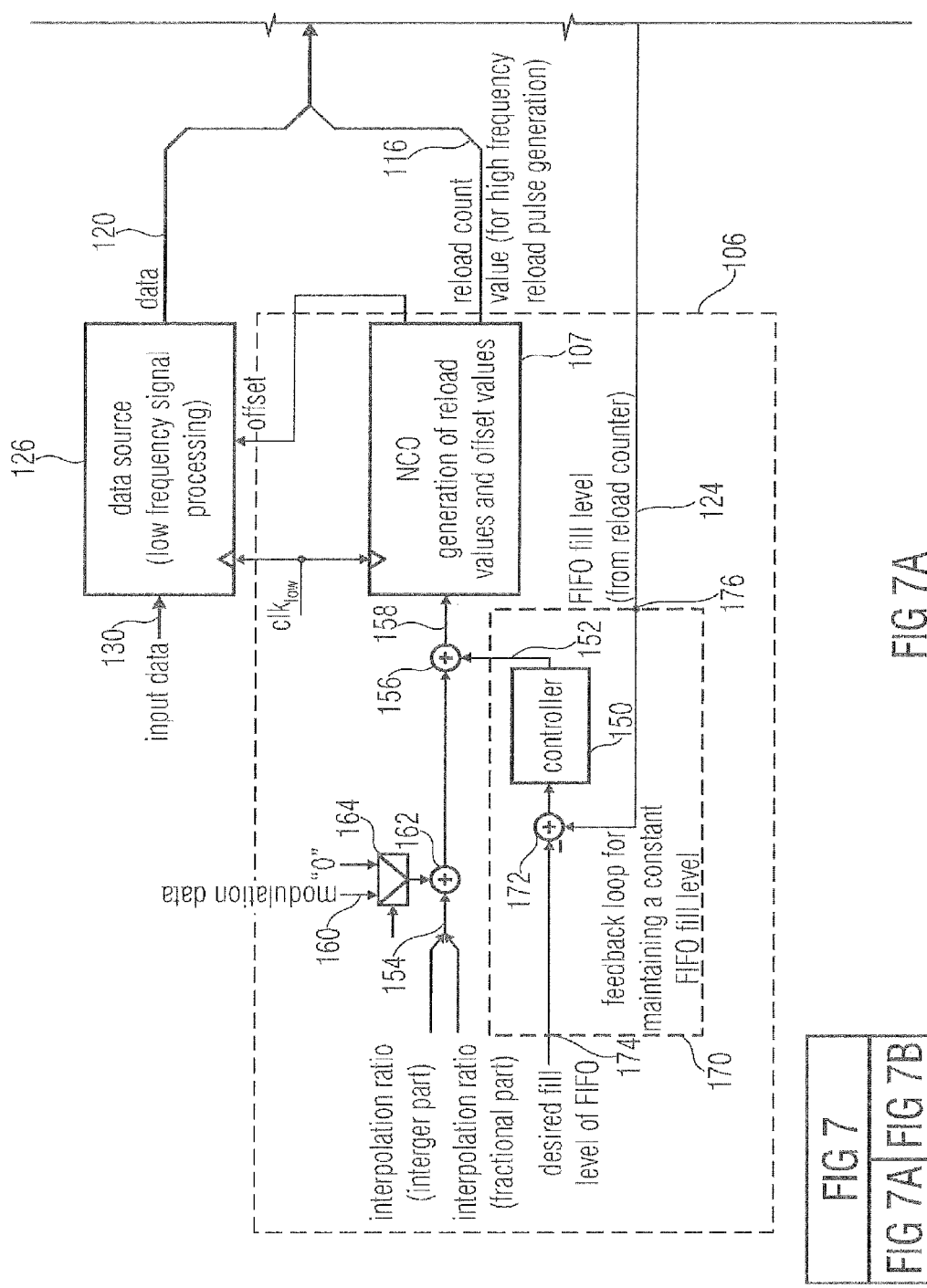

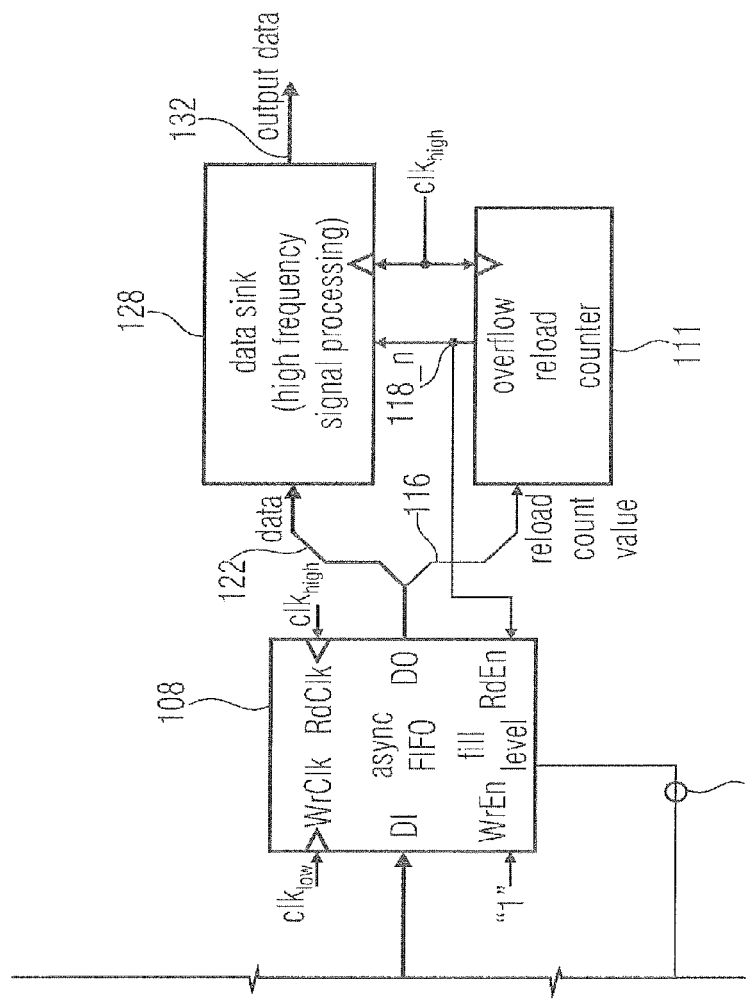

| FIG 8 |
|---|
| FIG 8A | FIG 8B |

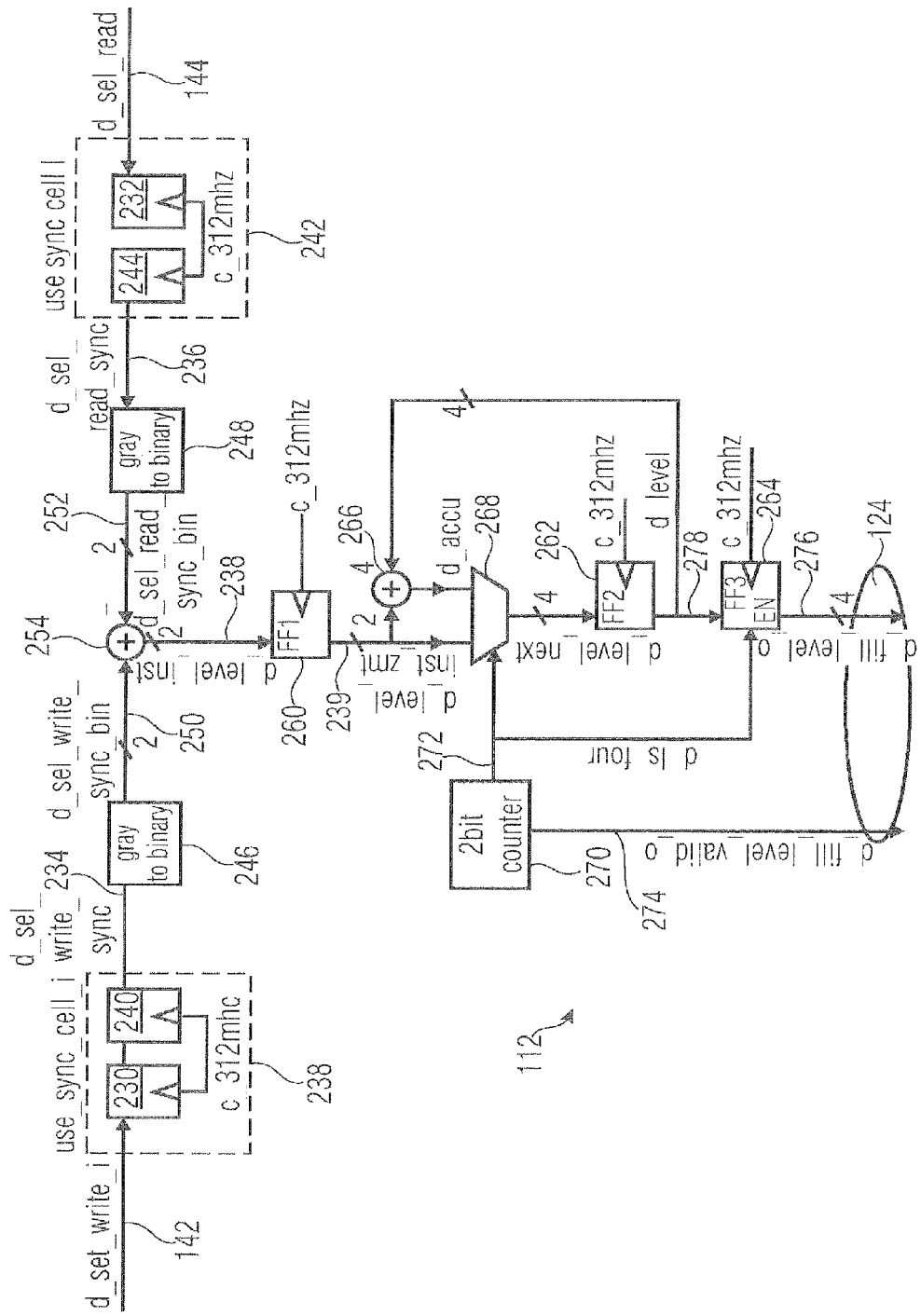

APPARATUS FOR SYNCHRONIZING A DATA HANDOVER BETWEEN A FIRST AND SECOND CLOCK DOMAIN THROUGH FIFO BUFFERING

FIELD

Embodiments of the present invention relate to an apparatus for synchronizing a data handover between a first clock domain and a second clock domain. Some embodiment of the present invention relate to a FIFO (FIFO=First-In-First-Out) based synchronization mechanism for fractional sample rate converters (FSRC).

BACKGROUND

A synchronization of two clock domains for data handover is used in a variety of applications such as in sample rate converters (SRC) and fractional sample rate converters (FSRC).

SUMMARY

Embodiments of the present invention provide an apparatus for synchronizing a data handover between a first clock domain and a second clock domain. The apparatus comprises a calculator, a first-in-first-out storage, a synchronization pulse generator, a fill level information provider and a feedback path. The calculator is clocked with the clock of the first clock domain and configured to provide a synchronization pulse cycle duration information describing a temporal position of synchronization pulses at a clock of the second clock domain. The first-in-first-out storage is configured to take over an input data value in synchronization with the first clock domain and to provide an output data value in synchronization with the second clock domain and in response to a current synchronization pulse. The synchronization pulse generator is clocked with the clock of the second clock domain and configured to generate the subsequent synchronization pulse such that the subsequent synchronization pulse is located at the temporal position described by the synchronization pulse cycle duration information. The fill level information provider is configured to provide a fill level information describing a fill level of the first-in-first-out storage. The feedback path is configured for feeding back the fill level information to the calculator that is further configured to adjust the synchronization pulse cycle duration information based on the fill level information.

Some embodiments of the present invention provide an apparatus for synchronizing a data handover between a first clock domain and a second clock domain. The apparatus comprises a calculator, a first-in-first-out storage, a synchronization pulse generator, a fill level information provider and a feedback path. The calculator is clocked with the clock of the first clock domain and configured to provide a synchronization pulse cycle duration information describing a temporal position of synchronization pulses at a clock of the second clock domain. The first-in-first-out storage is configured to take over the synchronization pulse cycle duration information, an input reload value and an input increment value in synchronization with the first clock domain, and provide the synchronization pulse cycle duration information, an output reload value and an output increment value in synchronization with the second clock domain and in response to a current synchronization pulse. The synchronization pulse generator is clocked with the clock of the second clock domain and configured to receive the synchronization pulse cycle duration information from the first-in-first-out storage and generate the subsequent synchronization pulse such that the subsequent synchronization pulse is located at the temporal position described by the synchronization pulse cycle duration information. The fill level information provider is configured to provide a fill level information describing a fill level of the first-in-first-out storage. The feedback path is configured for feeding back the fill level information to the calculator that is further configured to adjust the synchronization pulse cycle duration information based on the fill level information.

Further embodiments of the present invention provide a method for synchronizing a data handover between a first clock domain and a second clock domain. In a first step, a synchronization pulse cycle duration information describing a temporal position of synchronization pulses at a clock of the second clock domain is provided in the first clock domain. In a second step, an input data value is taken over in synchronization with the first clock domain and an output data value is provided in synchronization with the second clock domain and in response to a current synchronization pulse with a first-in-first-out storage. In a third step, the synchronization pulse is generated in the second clock domain such that the synchronization pulse is located at the temporal position described by the synchronization pulse cycle duration information. In a fourth step, a fill level information describing a fill level of the first-in-first-out storage is provided. In a fifth step, the fill level information is fed back to the first clock domain to adjust the synchronization pulse cycle duration information based on the fill level information.

BRIEF DESCRIPTION OF THE DRAWINGS

Embodiments of the present invention are described herein making reference to the appended drawings.

FIG. 7 shows a block diagram of the apparatus for synchronizing the data handover between the first clock domain and the second clock domain shown in FIG. 4, wherein the calculator further comprises a controller.

FIG. 9 shows a block diagram of the fill level information provider according to an embodiment of the present invention.

Figure 1:
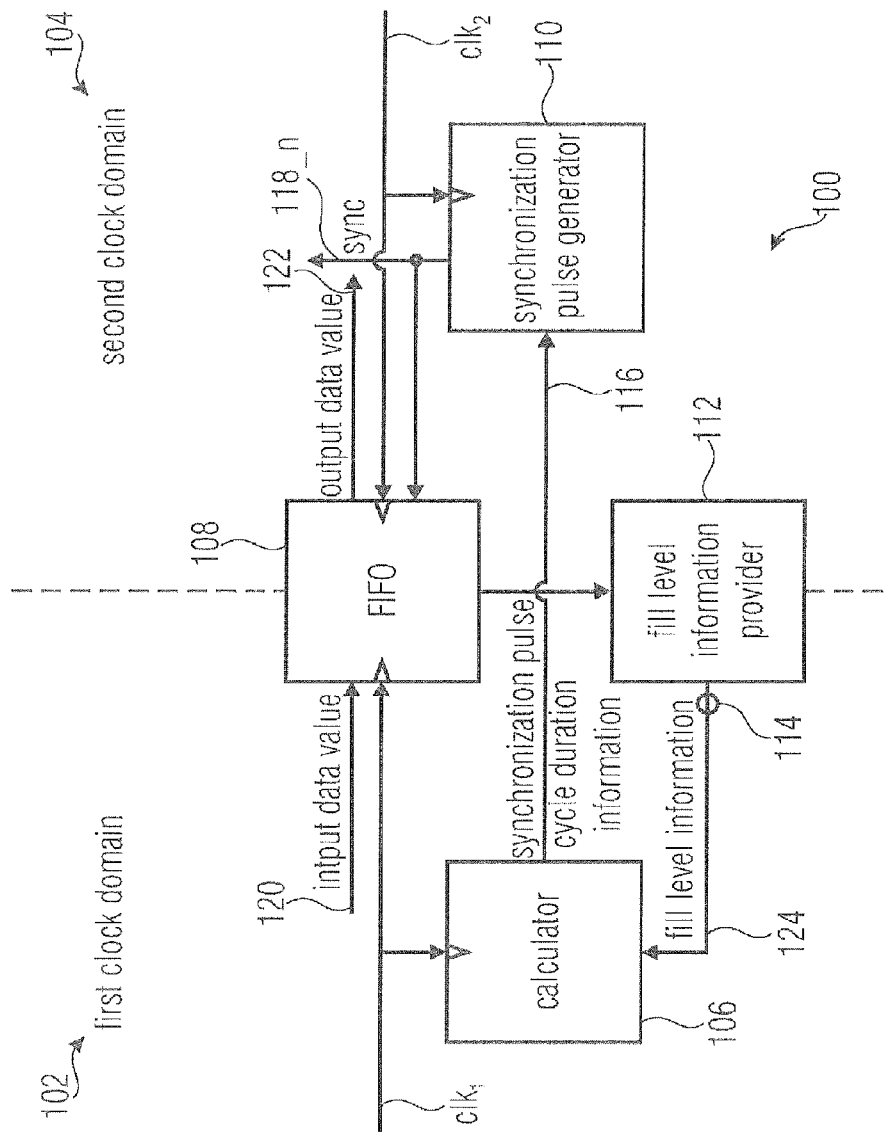
FIG. 1 shows a block diagram of an apparatus for synchronizing a data handover between a first clock domain and a second clock domain according to an embodiment of the present invention.

Equal or equivalent elements or elements with equal or equivalent functionality are denoted in the following description by equal or equivalent reference numerals.

DETAILED DESCRIPTION

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

FIG. 1 shows a block diagram of an apparatus 100 for synchronizing a data handover between a first clock domain 102 and a second clock domain 104 according to an embodiment of the present invention. The apparatus 100 comprises a calculator 106, a first-in-first-out storage 108, a synchronization pulse generator 110, a fill level information provider 112 and a feedback path 114. The calculator 106 is clocked with the clock $clk_1$ of the first clock domain 102 and configured to provide a synchronization pulse cycle duration information 116 describing a temporal position of synchronization pulses 118_$n$ at a clock $clk_2$ of the second clock domain 104. The first-in-first-out storage 108 is configured to take over an input data value in synchronization with the clock $clk_1$ of the first clock domain 102 and provide an output data value 122 in synchronization with the clock $clk_2$ of the second clock domain 104 and in response to a current synchronization pulse 118_$n$ (n=1). The synchronization pulse generator 110 is clocked with the clock $clk_2$ of the second clock domain 104 and configured to generate the subsequent synchronization pulse 118_$n$ (n=2) such that the subsequent synchronization pulse 118_$n$ (n=2) is located at the temporal position described by the synchronization pulse cycle duration information 116. The fill level information provider 112 is configured to provide a fill level information 124 describing a fill level of the first-in-first-out storage 108. The feedback path 114 is configured for feeding back the fill level information 124 to the calculator 106 that is further configured to adjust the synchronization pulse cycle duration information 116 based on the fill level information 124.

In embodiments, the data handover between the first clock domain 102 and the second clock domain 104 is realized by the first-in-first-out storage 108, e.g. by an asynchronous first-in-first-out storage that is clocked with the clock $clk_1$ of the first clock domain 102 and the clock $clk_2$ of the second clock domain 104, where the clock $clk_2$ of the second clock domain is equal to or greater than the clock $clk_1$ of the first clock domain 102 or vice versa. Moreover, the first-in-first-out storage 108 is configured to provide the output data value 122 (only) in response to synchronization pulses 118_$n$ in order to realize a synchronized data handover between the first clock domain 102 and the second clock domain 104.

The synchronization pulses 118_$n$ are generated by the synchronization pulse generator 110 at the temporal position described by the synchronization pulse cycle duration information 116. Since the synchronization pulse generator 110 is clocked with the clock $clk_2$ of the second clock domain 104, the synchronization pulses 118_$n$ can only be generated at clocks (e.g. rising or falling clock edges) of the second clock domain 104. Hence, the synchronization pulses 118_$n$ are located at specific clocks (e.g. specific rising or falling clock edges) of the second clock domain 104, the specific clocks being defined by the synchronization pulse cycle duration information 116.

By feeding back the fill level information 114 to the calculator 106, the synchronization pulse cycle duration information 116 can be adjusted such that the fill level of the first-in-first-out storage 108 is maintained within a predetermined area thereby providing a synchronized data handover having an almost constant latency.

Figure 6:
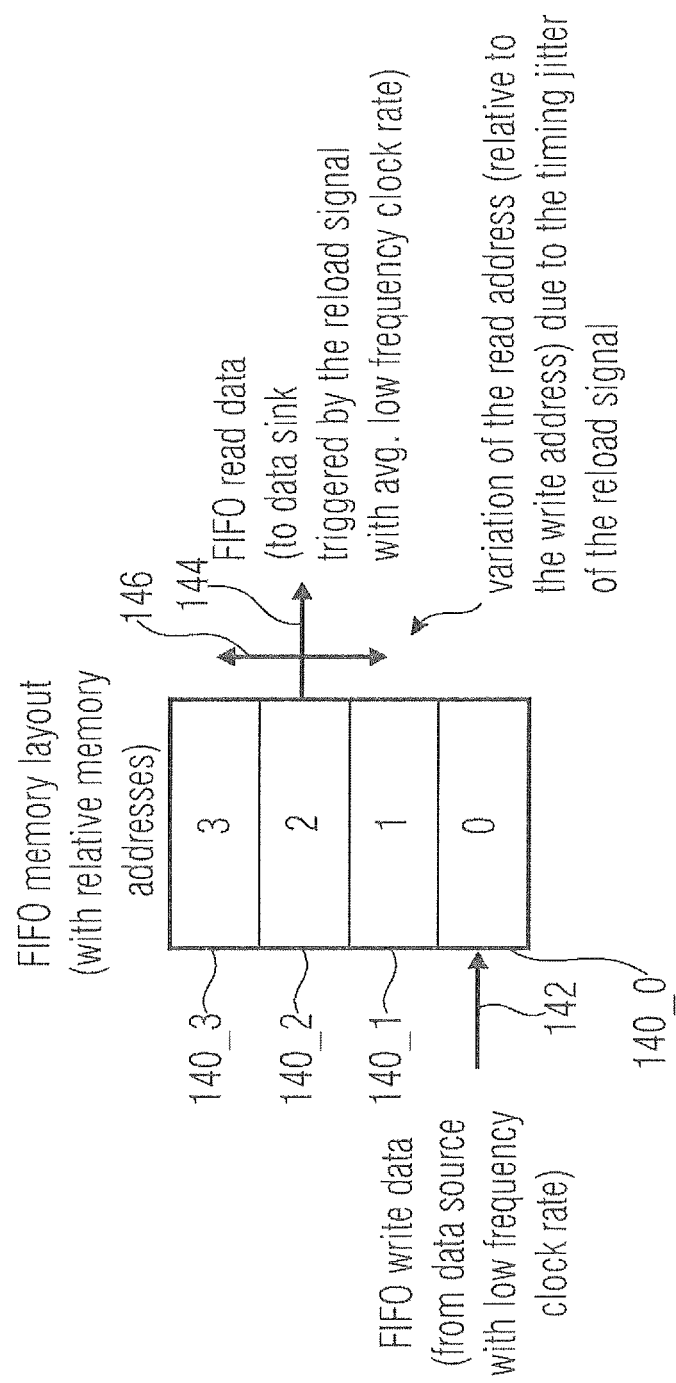
FIG. 6 shows a block diagram of a memory layout of the first-in-first-out storage according to an embodiment of the present invention.

For example, the first-in-first-out storage 108 can comprise a plurality of storage cells, where the fill level of the first-in-first-out storage 108 is maintained within a predetermined area being defined by a range of plus/minus one or two storage cell(s), i.e. the fill level of the first-in-first-out storage 108 may vary (only) in the range of plus/minus one or two storage cell(s) thereby avoiding an over- or under-run of the first-in-first-out storage 108 and hence providing a data handover having an almost constant latency (see FIG. 6).

In other words, the apparatus 100 is able to provide a constant (or almost constant) fill level of the first-in-first-out storage 108 and hence a constant (or almost constant) latency of the data synchronization mechanism. Moreover, synchronization can be kept up also in the case of variations of the clock $clk_1$ (or clock frequency $f_1$) of the first clock domain 102 or the clock $clk_2$ (or clock frequency $f_2$) of the second clock domain 104. Furthermore, the apparatus 100 allows the implementation of fractional sample rate converters (FSRC) having an interpolation ratio greater than or equal to one ($f_2/f_1 \geq 1$).

Figure 2:
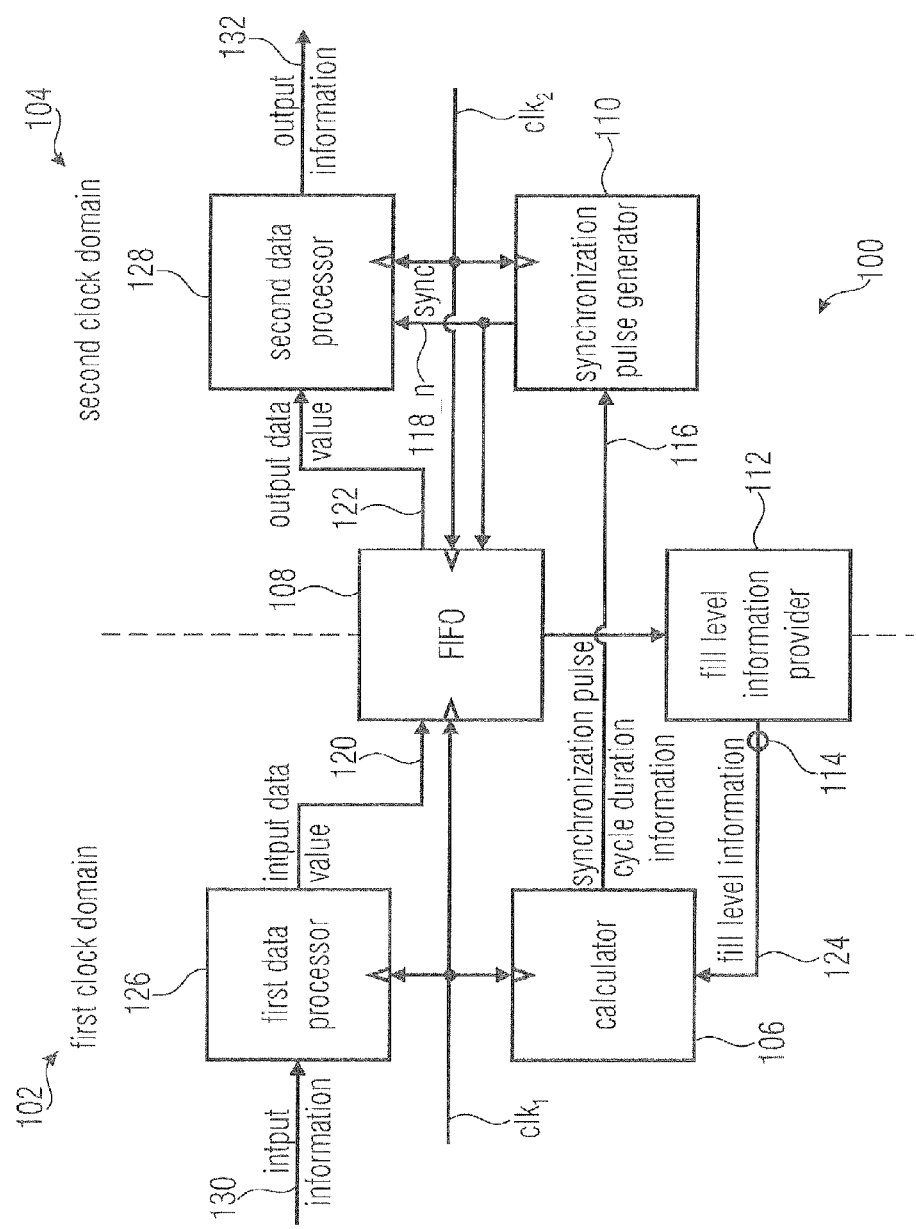
FIG. 2 shows a block diagram of the apparatus for synchronizing the data handover between the first clock domain and the second clock domain shown in FIG. 1 further comprising a first data processor and a second data processor.

FIG. 2 shows a block diagram of the apparatus 100 for synchronizing the data handover between the first clock domain 102 and the second clock domain 104 shown in FIG. 1 further comprising a first data processor 126 and a second data processor 128. The first data processor 126 is clocked with the clock $clk_1$ of the first clock domain 102 and configured to process an input information 130 such that the input data value 120 is provided in synchronization with the first clock domain 102 for the first-in-first-out storage 108. The second data processor 128 is clocked with the clock $clk_2$ of the second clock domain 104 and configured to receive the output data value 122 in synchronization with the second clock domain 104 and in response to the current synchronization pulse 118_$n$ (n=1) from the first-in-first-out storage 108, and process the output data value 122 such that an output information 132 is provided in synchronization with the clock $clk_2$ of the second clock domain 104.

In embodiments, the first data processor 126 can be referred to as a data source, where the second data processor 128 can be referred to as a data sink due to the first data processor 126 providing the input data value 120 for the first-in-first-out storage 108 and the second data processor 128 receiving the output data value 122 from the first-in-first-out storage 108.

In the following, features of the apparatus 100 for synchronizing a data handover between the first clock domain 102 and the second clock domain 104 are described making reference to an exemplary embodiment. In other words, in the following, a synchronization mechanism for signal processing blocks which incorporate a data handover between two different clock domains is described where the clock frequency $f_1$ of the first clock domain 102 (data source) is lower than the clock frequency $f_2$ of the second clock domain 104 (data sink). Hence, subsequently, in one embodiment the first clock domain 102 can be referred to as low frequency clock domain where the second clock domain 104 can be referred to as high frequency clock domain. Thereby, the ratio of clock frequencies ($f_1/f_2$) can be arbitrary and/or greater than one. Moreover, the reload rate of data in the high frequency clock domain 128 (data sink) may have on average the same rate as the clock frequency of the low frequency clock domain 102 (data source). Naturally, features of the following description are also applicable to the apparatus 100 for synchronizing the data handover between the first clock domain 102 and the second clock domain 104 shown in FIGS. 1 and 2.

Furthermore, the synchronization pulse 118_n can be referred to as a reload signal or reload pulse since the second data processor 128 can be configured to receive, or in other words, to reload the output data value 122 in response to a synchronization pulse 118_n.

Figure 3:
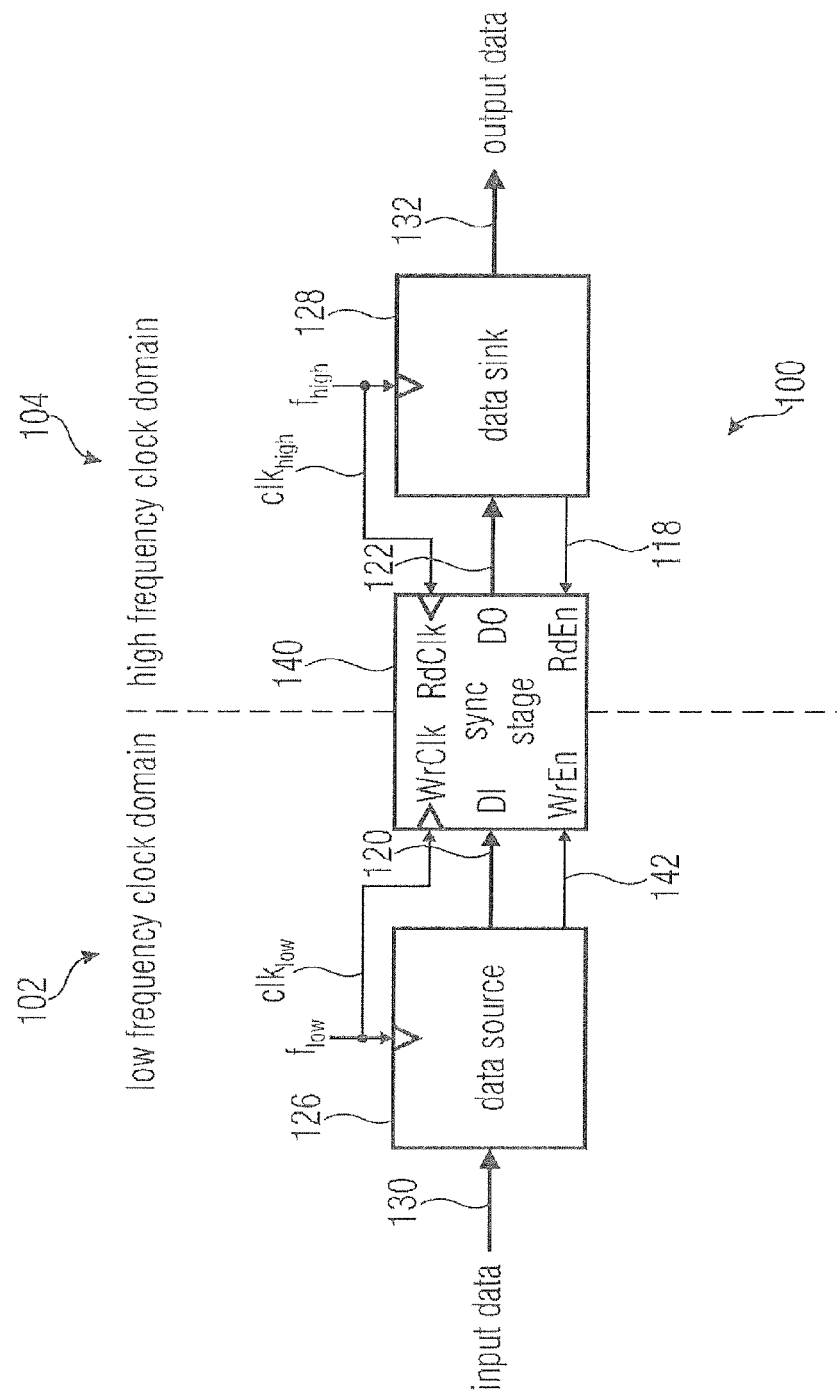
FIG. 3 shows a block diagram of an apparatus for synchronizing a data handover between a low frequency clock domain and a high frequency clock domain according to an embodiment of the present invention.

FIG. 3 shows a block diagram of an apparatus 100 for synchronizing a data handover between a first (or low frequency) clock domain 102 and a second (or high frequency) clock domain 104 according to an embodiment of the present invention. In other words, FIG. 3 shows the structure of a signal processing system having a synchronized data handover.

The apparatus 100 comprises a data source 126, a data sink 128 and a synchronization stage 140, where the first-in-first-out storage 108, the synchronization pulse generator 110 and the fill level information provider 112 shown in FIGS. 1 and 2 can be implemented in the synchronization stage 140.

Alternatively, the first-in-first-out storage 108 and the fill level information provider 112 can be implemented in the synchronization stage 140, where the calculator 106 is implemented in the data source 126 and the synchronization pulse generator 110 is implemented in the data sink 128. In that case, the data source 126 can be configured to provide the input data value 120 in synchronization with the first (or low frequency) clock domain 102 for the synchronization stage 140, where the data sink 128 can be configured to receive the output data value 122 from the synchronization stage 140 in synchronization with the second (or high frequency) clock domain 104 and in response to a current synchronization pulse 118_n (n=1). Moreover, the data source 126 can be configured to provide a write enable signal 142 for the synchronization stage 140, where the data sink 128 comprising the synchronization pulse generator 110 can be configured to provide the synchronization pulses 118_n (or read enable signals) for the synchronization stage 140.

The apparatus 100 according to the concept of the present invention even works when the ratio between the clock frequency of the first (or high frequency) clock domain 104 and the clock frequency of the second (or low frequency) clock domain ($f_{high}/f_{low}$) becomes small, e.g. greater than or equal to one, two or three. Moreover, even in the case of fractional frequency ratios ($f_{high}/f_{low}$) and/or a modulated (time varying) clock $clk_{high}$ of the second (or high frequency) clock domain 104, the synchronization pulse 118_n (or data reload signal of the data sink) can be synchronized properly with the clock $clk_{low}$ of the first (or low frequency) clock domain 102. Thereby, it can be guaranteed that the output data value 122 is not provided to the second data processor 128 before a new input data value 120 is provided by the first data processor 126, or in other words, that the reload of data in the data sink 128 does not occur before new reload values are delivered by the data source 126. In addition, the apparatus 100 shown in FIG. 3 is able to provide a data handover from the data source 126 to the data sink 128 having a constant (or almost constant) latency.

In contrast to known solutions that simply use an asynchronous first-in-first-out storage 108 (or memory) for synchronization, the apparatus 100 according to the concept of the present invention comprises a synchronization stage 140 with a calculator 106, a first-in-first-out storage 108, a synchronization pulse generator 110 and a fill level information provider 112. The apparatus 100 is able to provide a constant (or almost constant) synchronization latency, or in other words, a data handover between the first (or low frequency) clock domain 102 and the second (or high frequency) clock domain 104 having a constant (or almost constant) latency. Hence, the latency may not depend on the fill level of the first-in-first-out storage 108 and hence not on the startup of the synchronization. Moreover, in closed loop systems, such as PLLs (PLL=phase locked loop), a constant latency is desired in order to get a defined loop response. Even when the read rate of data on the data sink port differs from the write rate at the data source port of the first-in-first-out storage 108, the fill level of the first-in-first-out storage 108 will not drift away, i.e. the latency of the signal processing block will not change. Thereby, an under- or over-run of the first-in-first-out storage 108 is avoided even in the case of a long term rate mismatch.

Figure 4:
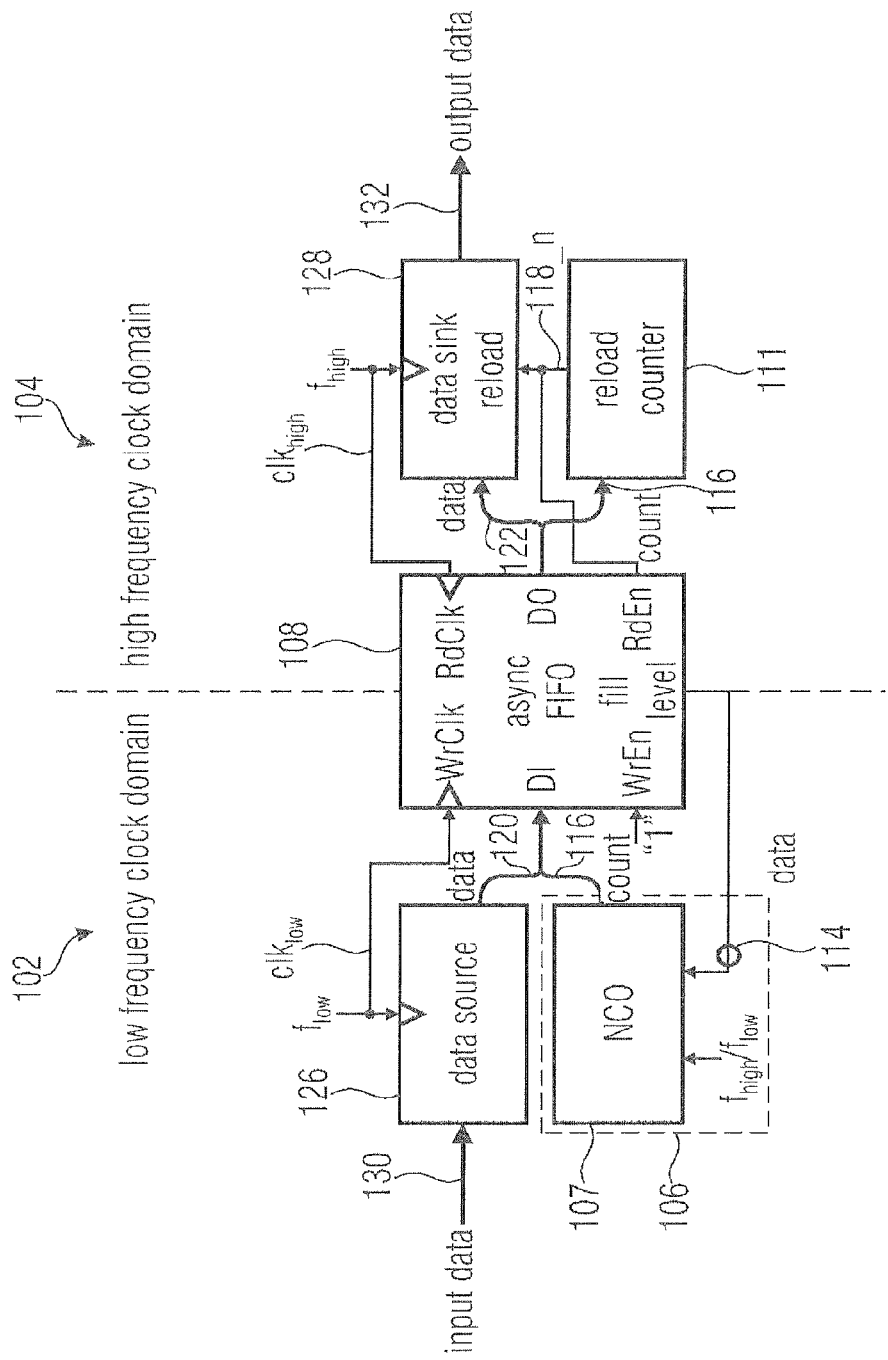
FIG. 4 shows a block diagram of an apparatus for synchronizing a data handover between a first clock domain and a second clock domain according to an embodiment of the present invention.

FIG. 4 shows a block diagram of an apparatus 100 for synchronizing a data handover between a first (or low frequency) clock domain 102 and a second (or high frequency) clock domain 104 according to an embodiment of the present invention. The apparatus 100 comprises a calculator 106, a first-in-first-out storage 108, a reload counter 111, a data source 126 and a data sink 128.

In some embodiments, the calculator 106 comprises a numerically controlled oscillator 107 (NCO). Furthermore, the reload counter 111 comprises the synchronization pulse generator 110 shown in FIGS. 1 and 2. Moreover, in one embodiment the first-in-first-out storage 108 comprises an asynchronous first-in-first-out storage. In addition, the first-in-first-out storage comprises the fill level information provider 112 shown in FIGS. 1 and 2.

As shown in FIG. 4, in one embodiment the first-in-first-out storage 108 is configured to take over the synchronization pulse cycle duration information 116 in synchronization with the first (or low frequency) clock domain 102 and to provide the synchronization pulse cycle duration information 116 in synchronization with the second (or high frequency) clock domain 104 and in response to a current synchronization pulse 118_n (n=1). The synchronization pulse generator 110 is configured to receive the synchronization pulse cycle duration information 116 from the first-in-first-out storage 108 in synchronization with the second (or high frequency) clock domain 104 and in response to a current synchronization pulse 118_n (n=1).

Moreover, the calculator 106 is configured to provide the synchronization pulse cycle duration information 116 such that the synchronization pulse cycle duration information 116 represents a number of clocks in the second (or high frequency) clock domain between the current synchronization pulse 118_n (n=1) and the subsequent synchronization pulse 118_n (n=2). In other words, the synchronization pulse cycle duration information 116 may define the number of clocks in the second (or high frequency) clock domain between subsequent synchronization pulses (e.g. 118_n (n=1) and 118_n (n=2)) and hence the period of the synchronization pulses 118_n. Moreover, the calculator 106 can be configured to adjust the temporal position of the subsequent synchronization pulse 118_n (n=2) by increasing or decreasing the number of clocks in the second (or high frequency) clock domain 116 in order to keep a predetermined fill level of the first-in-first-out storage 108.

In some embodiments, the first-in-first-out storage 108 is configured to take over the synchronization pulse cycle duration information 116 and the input data 120 in one clock cycle of the first (or low frequency) clock domain 102, and provide the synchronization pulse cycle duration information 116 and the output data value 122 in one clock cycle of the second (or high frequency) clock domain 104. In that case, the synchronization pulse cycle duration information 116 may describe the number of clocks in the second (or high frequency) clock domain 104 for which the output data value 122 is valid.

According to the concept of the present invention, in one embodiment the fill level of the first-in-first-out storage 108 is fed back into the numerically controlled oscillator 107. The numerically controlled oscillator 107 calculates the validity of each input data value 120 (or FIFO entry) in terms of numbers of clocks in the second (or high frequency) clock domain 116, or in other words, in terms of clock cycles of the second (or high frequency) clock signal ($f_{high}$). The number of clocks in the second (or high frequency) clock domain 116 (validity value) are stored together with the input data value 120 (actual data) in the first-in-first-out storage 108. When a first-in-first-out storage cell is read, the number of clocks in the high frequency clock domain 116 (validity value) is loaded into the reload counter 111 which is decremented in each clock cycle of the second (or high frequency) clock domain by a predefined number, e.g. one. On a counter underrun, the validity of the output data value 122 (current data) expires and the next output data value 122 is read from the first-in-first-out storage 108. Naturally, alternative implementations of the reload counter 111 are possible, e.g. in which the counter value is incremented.

The apparatus 100 according to the concept of the present invention enables the system to maintain a constant (or almost constant) fill level of the first-in-first-out storage 108 and hence a constant (or almost constant) latency of the data synchronization mechanism. In addition, by using the apparatus 100 synchronization is maintained also in case of variations of the read and/or write rate of the first-in-first-out storage 108.

Moreover, the apparatus 100 allows the implementation of (fractional) sample rate converters (FSRC) with an interpolation ratio greater than or equal to one ($f_{high}/f_{low} \geq 1$). This is possible due to the separation of data write access of the data source 126 and data read access of the data sink 128 in the address space of the first-in-first-out storage 108 and not by separation in time.

In some embodiments, the fill level of the first-in-first-out storage 108 used for data handover between the first (or low frequency) clock domain 102 and the second (or high frequency) clock domain 104 is controlled by a control loop comprising the numerically controlled oscillator 107 (see FIG. 7). Consequently, the numerically controlled oscillator 107 is configured to use the fill level information 124 describing the actual fill level of the first-in-first-out storage 108 as a feedback signal and compute a correction value of the numerically controlled oscillator 107 input for each input data value 120 put into the first-in-first-out storage 108. With this correction value, the fill level of the first-in-first-out storage 108 is controlled indirectly by changing the number of clocks in the second (or high frequency) clock domain 116 and hence an average value of the reload counter 111 and accordingly changing the first-in-first-out storage 108 read rate.

This can be necessary during the start-up phase of the apparatus 100 (or signal processing blocks) in order to maintain a certain fill level of the first-in-first-out storage 108. When the clock rate of the first (or low frequency) clock domain 102 or the clock rate of the second (or high frequency) clock domain 104 has a (transient or permanent) frequency deviation, this mechanism (or control loop) can be used to correct the frequency ratio ($f_{high}/f_{low}$) in the numerically controlled oscillator 107. Hence, the apparatus 100 can be used in applications where the reload of low frequency data on the high rate is done continuously with the average low data rate (e.g. fractional sample rate converter with integrating output).

Moreover, the apparatus 100 according to the concept of the present invention can be implemented even when the ratio between the clock frequency of the first (or low frequency) clock domain 102 (data sink frequency) and the clock frequency of the second (or high frequency) clock domain 104 (data source frequency) becomes low, e.g. greater than or equal to one, two or three, as it is required for fractional sample rate converters used in wide band polar modulators, such as LTE 20 (LTE=Long Term Evolution). Even when the frequency ratio ($f_{high}/f_{low}$) becomes low, e.g. close to one, there is enough clearance for the synchronization pulse 118_n which has not to be positioned in time between two clock edges, e.g. rising or falling clock edges, of the first (or low frequency) clock domain 102, as it will become clear from the discussion below.

Figure 5:
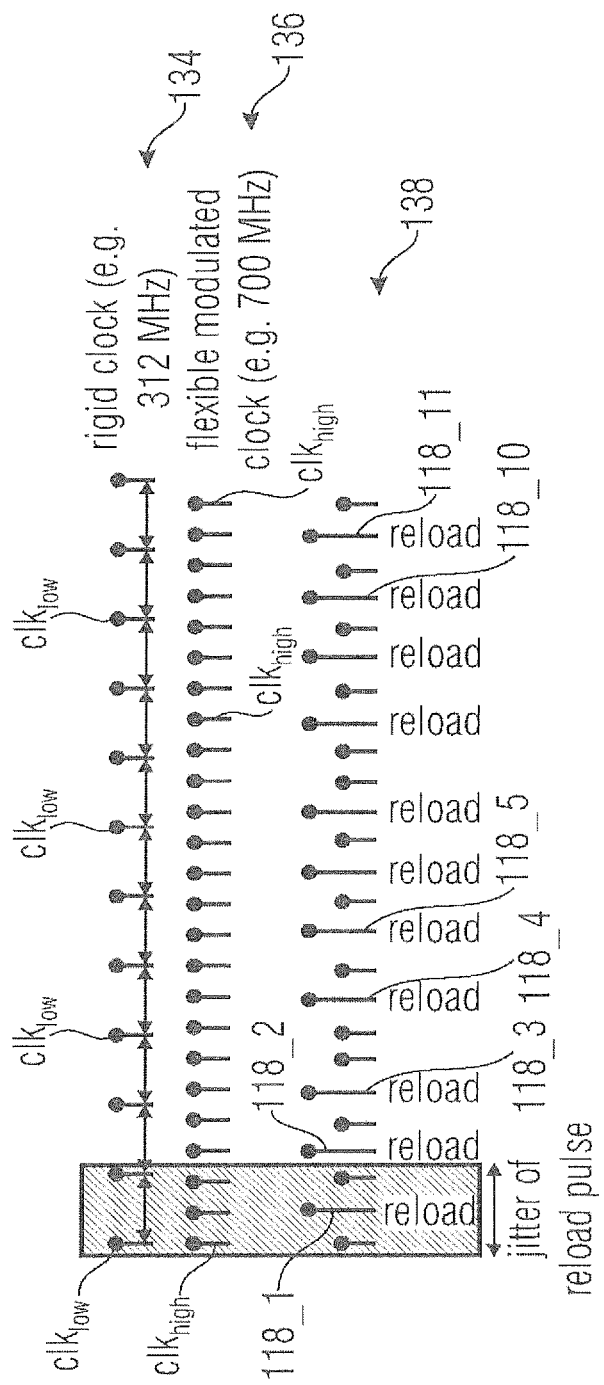
FIG. 5 shows in a diagram exemplary timings of the first clock domain and the second clock domain of the apparatus shown in FIGS. 3 and 4.

FIG. 5 shows in a diagram exemplary timings of the first (or low frequency) clock domain 102 and the second (or high frequency) clock domain 104 of the apparatus 100 shown in FIGS. 3 and 4. Thereby, in FIG. 5, from top to bottom are shown the timings 134 of the clock $clk_{low}$ of the first (or low frequency) clock domain 102; the timings 136 of the clock $clk_{high}$ of the second (or high frequency) clock domain 104; and the timings 138 of the synchronization pulse 118_n (n=1) to 118_n (n=11). In FIG. 5, the first (or low frequency) clock domain 102 is exemplarily clocked with a clock frequency of 312 MHz, where the second (or high frequency) clock domain 104 is exemplarily clocked with a clock frequency of 700 MHz. Naturally, the following description is also applicable for other clock frequencies of the first clock domain 102 and/or the second clock domain 104.

In contrast to known solutions where the synchronization pulse 118_n (or reload pulse) has to be placed with enough clearance between two clock edges, e.g. rising or falling clock edges, of the first (or low frequency) clock domain 102 in order to avoid setup- and/or hold-violations in the data transfer from the first (or low frequency) clock domain 102 to the second (or high frequency) clock domain 104, the apparatus 100 enables a setup- and hold-violation free data transfer even for frequency ratios ($f_{high}/f_{low}$) lower than three. Moreover, no uncertainty in sampling the position of the synchronization pulse 118_n (or reload pulse) is introduced. In addition, a jitter of the synchronization pulse 118_n (or reload pulse) is avoided which otherwise could be introduced by an integer delta-sigma modulated count cycles of the reload counter. Furthermore, even when the clock of the second (or high frequency) clock domain 104 is modulated, as it is the case in PLLs in polar modulators (PLL=Phase Locked Loop), no uncertainty is introduced.

The apparatus 100 according to the concept of the present invention is advantageous for the implementation of, for example, fractional sample rate converters in wide band polar modulators. These modulators need fractional sample rate converters for interpolation of AM (AM=amplitude modulator) and PM (PM=phase modulator) signals from a signal rate of several 100 MHz (e.g. 312 MHz as depicted in FIG. 5) to the modulated RF frequency (RF=radio frequency) in the GHz range, e.g. 1 GHz, 10 GHz or 100 GHz.

The required depth of the synchronization first-in-first-out storage 108 may depend on the maximum timing jitter of the synchronization pulses 118_n (or reload signals). The timing jitter of the synchronization pulses 118_n (or reload signals) may depend on the modulation data and the sequence of numbers of clocks in the second (or high frequency) clock domain 116 (or reload count sequence of the numerically controlled oscillator 107). Thereby, it has to made sure that there is no access to the same storage cell (memory position) of the first-in-first-out storage 108 at the same time. Hence, the first-in-first-out storage 108 may have a depth of at least four storage cells (or registers). One storage cell (or register) for the write access and one storage cell (or register) for the read access and one storage cell (or register) in front and after the read address as a guard for accidental read and/or write access to the same storage cell (or register).

FIG. 6 shows a block diagram of a memory layout of the first-in-first-out storage 108 according to an embodiment of the present invention. The fist-in-first-out storage 108 comprises a plurality of storage cells 140_0 to 140_3, wherein the first-in-first-out storage 108 is configured to take over the input data value 120 into a storage cell (e.g. 140_0) of the plurality of storage cells 140_0 to 140_3 indicated by a write pointer value 142, and wherein the first-in-first-out storage 108 is configured to provide the output data value 122 from an other storage cell (e.g. 140_2) of the plurality of storage cells 140_0 to 1403 indicated by a read pointer value 144.

As shown in FIG. 6, the fill level of the first-in-first-out storage 108 may vary in the range 146 of plus/minus one storage cell (e.g. 140_1 to 140_3). In other words, the variations of the read address indicated by the read pointer value 144 (relative to the write address indicated by the write pointer value 142) may vary in the range of plus/minus one storage cell (e.g. 140_1 to 140_3) due to the timing jitter of the synchronization pulse 118_n (or reload signal). Thereby, an over- or under-run of the first-in-first-out storage 108 can be avoided and hence a data handover between the first (or low frequency) clock domain 102 and the second (or high frequency) clock domain 104 having an almost constant latency can be provided.

In some embodiments, the first-in-first-out storage 108 may have a depth of at least four (storage cells) due to the necessity of two guard storage cells (memory addresses). Thereby, an average fill level of the first-in-first-out storage 108 will be two. Therefore, the delay (or latency) introduced by the synchronization first-in-first-out storage 108 will be in average two clock periods of the first (or low frequency) clock domain 102.

FIG. 7 shows a block diagram of the apparatus 100 for synchronizing the data handover between the first (or low frequency) clock domain 102 and the second (or high frequency) clock domain 104 shown in FIG. 4, wherein the calculator 106 further comprises a controller 150. In other words, FIG. 7 depicts the structure of the complete first-in-first-out storage 108 based fractional sample rate converter with feedback of the fill level to the numerically controlled oscillator 107.

In one embodiment the controller 150 is configured to regulate the synchronization pulse cycle duration information 116 to bring the fill level information 124 towards a predetermined target fill level information. For example, the synchronization pulse cycle duration information 116 represents a number of clocks in the second (or high frequency) clock domain 116, where the controller 150 is configured to regulate the number of clocks in the second (or high frequency) clock domain 116 such that the fill level of the first-in-first-out storage 108 is maintained within a predetermined area, thereby providing a data handover having an almost constant latency.

Moreover, in one embodiment the calculator 106 is configured to combine an output value 152 of the controller 150 with a frequency ratio value 154 describing a frequency ratio between the clock frequency of the second (or high frequency) clock domain 104 and the clock frequency of the first (or low frequency) clock domain 102 in order to obtain the synchronization pulse cycle duration information 116. In other words, the controller 152 is configured to correct the frequency ratio value 154 describing the ratio between the frequency of the second (or high frequency) clock domain 104 and the frequency of the first (or low frequency) clock domain 102 that is fed into the numerically controlled oscillator 107. Thereby, the frequency ratio value 154 can comprise an integer and/or a fractional part.

For example, the frequency ratio value 154 fed into the numerically controlled oscillator 107 can be increased or decreased by adding an output value 152 of the controller 150 to the frequency ratio value 154 by means of a first adder 156. In addition, a modulation data value 160 describing the modulation data can be added to the frequency ratio value 154 fed into the numerically controlled oscillator 107 by means of a second adder 162. Moreover, the second adder 162 can be coupled to an output of a multiplexor 164 that is configured to provide at its output, based on a binary control signal, either the modulation data value 160 present at its first input or a reference value (e.g. zero) present at its second input.

In addition, the calculator 106 can comprise a feedback control loop 170. The feedback control loop 170 can comprise the controller 150, a first adder 172 an input 174 for a desired fill level of the first-in-first-out storage 108 and an input 176 for the fill level information 124. The fill level information 124 present at the input 176 is subtracted from the desired fill level information present at the input 174 and fed into the controller 150 by means of the first adder 172.

The fill level of the first-in-first-out storage 108 is controlled by the number of clocks in the high frequency clock domain 116 (count value) for the generation of the synchronization pulses 118_n (reload signals). The number of clocks in the high frequency clock domain 116 (count value) is generated in the numerically controlled oscillator 107 which is clocked with the clock of the first (or low frequency) clock domain 102, or in other words, which is operated on the low frequency clock. Hence, a feedback of the fill level information 124 to the first (or low frequency) clock domain 102 is necessary. The actual fill level of the first-in-first-out storage 108 is processed in the feedback controller 150 which can be implemented in the numerically controlled oscillator 107 and corrects the frequency ratio value 154 temporarily in order to establish the desired fill level of the first-in-first-out storage 108. In regular operation, the feedback control loop 170 of the fill level is only active when the frequency ratio ($f_{high}/f_{low}$) is disturbed. It is possible to disable the control loop 170 or to define a depth-zone for the fill level information 124 (or feedback value) where no control action takes place. This will minimize the interaction of the feedback controller 150.

Figure 8A:
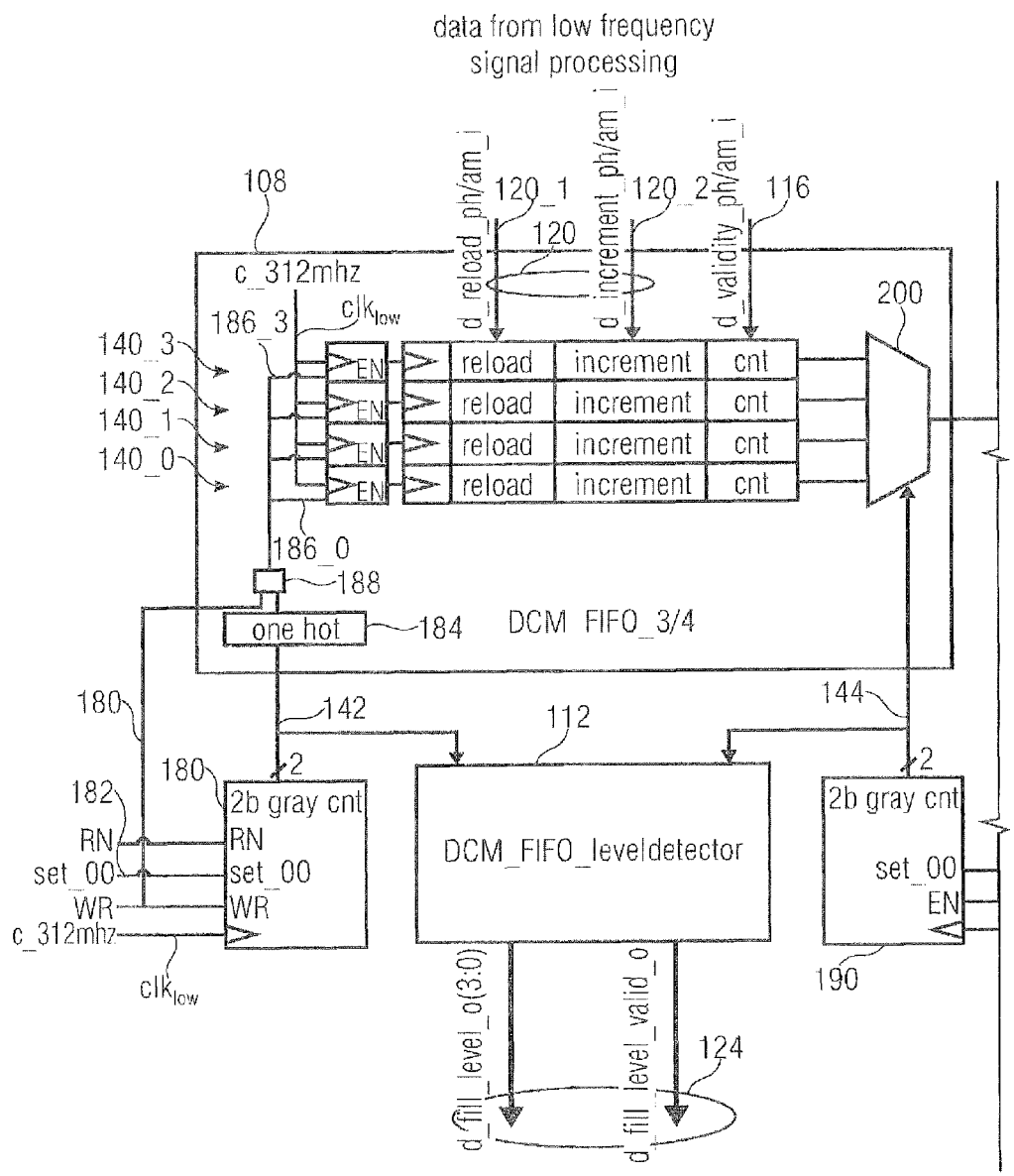
FIG. 8 shows a block diagram of the first-in-first-out storage, the reload counter 111 and the fill level information provider 112 according to an embodiment of the present invention.
Figure 8B:
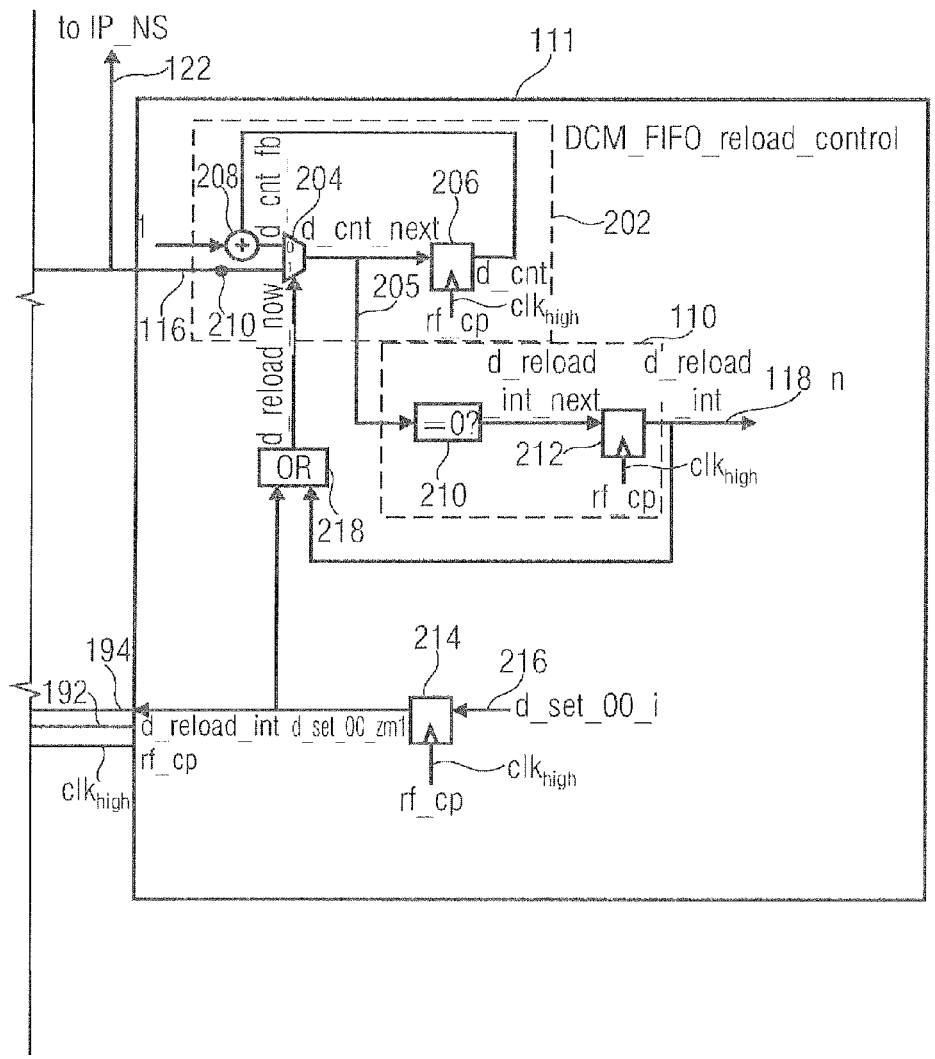

FIG. 8 shows a block diagram of the first-in-first-out storage 108, the reload counter 111 and the fill level information provider 112 according to an embodiment of the present invention. In other words, FIG. 8 shows a possible implementation of the first-in-first-out storage 108 and the reload signal 118_n generation.

The first-in-first-out storage 108 comprises a plurality of storage cells 140_0 to 140_3, wherein the first-in-first-out storage 108 is configured to take over or receive the input data value 120 into a storage cell of the plurality of storage cells 140_0 to 140_3 indicated by a write pointer value 142, and wherein the first-in-first-out storage 108 is configured to provide the output data value 122 from another storage cell of the plurality of storage cells 140_0 to 1403 indicated by a read pointer value 144. In the example of FIG. 8, the first-in-first-out storage 108 comprises four storage cells 140_0 to 1403. Naturally, the first-in-first-out storage 108 can comprise more than four storage cells.

As shown in FIG. 8, in some embodiments, the input data value 120 can comprise an input reload value 120_1 and an input increment value 120_2. In that case, the first data processor 126 (data source) is configured to process the input information 130 such that the input reload value 120_1 and the input increment value 120_2 are provided in synchronization with the first (or low frequency) clock domain for the first-in-first-out storage 108. The first-in-first-out storage 108 can be configured to take over, e.g. in one clock cycle of the first (or low frequency) clock domain 102, the input reload value 120_1, the input increment value 120_2 and the synchronization pulse cycle duration information 116, and provide an output reload value 122_1, an output increment value 122_2 and the synchronization pulse cycle duration information 116 in synchronization with the second (or high frequency) clock domain 104 and in response to a current synchronization pulse 118_$n$ (n=1). Moreover, the second data processor 128 (data sink) is configured to receive the output reload value 122_1 and the output increment value 122_2 in synchronization with the second (or high frequency) clock domain 104 and in response to a current synchronization pulse 118_$n$ (n=1) from the first-in-first-out storage 108, and process the output reload value 122_1 and the output increment value 122_2 such that an output information 132 is provided in synchronization with the second (or high frequency) clock domain.

For example, the second data processor 128 (data sink) can comprise an integrator configured to provide the output reload value 122_1 as output information 132 in response to the current synchronization pulse 118_$n$ (n=1) (or reload signal) and increment the previous output information by the output increment value 122_2 at each subsequent clock of the second (or high frequency) clock domain 104.

As shown in FIG. 8, in some embodiments, the write pointer value 142 can be generated by a first gray counter 180 that is clocked with the clock $clk_{low}$ of the first (or low frequency) clock domain 102. The first gray counter 180 can be configured to count in synchronization with the first (or low frequency) clock domain 102 and provide a gray coded counter reading as write pointer value 142. For example, when the first-in-first-out storage 108 comprises four storage cells, the first gray counter 180 is configured to count from zero to three using the gray code in synchronization with the first (or low frequency) clock domain 102 and restart counting after having counted from zero to three.

Moreover, the first gray counter 180 in one embodiment comprises an input for a write enable signal 180, where the first gray counter 180 is configured to count in synchronization with the first (or low frequency) clock domain 102 based on the write enable signal 180. Furthermore, the first gray counter 180 can have an input for a reset signal 182, where the first gray counter 180 is configured to reset its counter reading to an initial value in dependence on the reset signal 182.

In one embodiment the output of the first gray counter 180 is coupled to a demultiplexer 184 that is configured to activate one of a plurality of signal lines 186_0 to 186_3 at its output based on the write pointer value 142 present at its input.

Thereby, each signal line of the plurality of signal lines 186_0 to 186_3 is coupled to one storage cell of the plurality of storage cells 140_0 to 140_3 of the first-in-first-out storage 108. Moreover, each signal line 186_0 to 186_3 is coupled to the corresponding storage cell of the plurality of storage cells 140_0 to 140_3 by means of an or-block 188 such that the corresponding signal line 186_0 to 186_3 is activated based on the write enable signal 180 that is coupled to the or-block 188.

The first-in-first-out storage 108 can comprise a second gray counter 190. The output of the second gray counter 190 is coupled to an multiplexer 200 that is configured to provide at its output, based on the read pointer value 144 present at its control terminal, the output reload value 120_1, the output increment value 122_2 and the synchronization pulse cycle duration information 116 stored in one storage cell of the plurality of storage cells 140_0 to 140_3 of the first-in-first-out storage 108.

The apparatus 100 can comprise a counter 202 clocked with the clock $clk_{high}$ of the second (or high frequency) clock domain and configured to count the clocks in the second (or high frequency) clock domain 104 and provide a counter reading 204. Thereby, the synchronization pulse generator 110 is configured to generate the subsequent generation pulse 118_$n$ (n=2) based on the counter reading 204 such that the subsequent synchronization pulse 118_$n$ (n=2) is located at the temporal position described by the number of clocks in the second clock domain that is represented by the synchronization pulse cycle duration information 116, wherein the counter reading 204 is set to an initial value in response to the generation of the subsequent synchronization pulse 118_$n$ (n=2).

Moreover, in one embodiment the apparatus 100 is configured to set the counter reading 204 to the number of clocks in the second (or high frequency) clock domain 104 represented by the synchronization clock cycle duration information 116 in response to the current synchronization pulse 118_$n$ (n=1), and count down the counter reading 204 from the set counter reading in synchronization with the clock of the second (or high frequency) clock domain 104. Thereby, the synchronization pulse generator 110 is configured to compare the counter reading 204 with a predefined number and generate the subsequent synchronization pulse 118_$n$ (n=2) when the predefined number is equal to the counter reading 204.

For example, the counter 202 can comprise a multiplexer 204, a register 206 and an adder 208. Note that the above listed blocks of the counter 202 are clocked with the clock $clk_{high}$ of the second (or high frequency) clock domain 104.

An output of the register 206 for sampling the counter reading 204 can be coupled to the adder 208. The adder 208 can be configured to add a predefined value, e.g. one, to the sampled counter reading. An output of the adder 208 and the input 210 for the number of clocks in the second (or high frequency) clock domain 116 are coupled to inputs of the multiplexer 204. The multiplexer 204 is configured to provide at its output the number of clocks in the second (or high frequency) clock domain 116 in response to a synchronization pulse 118_$n$ and the incremented counter reading otherwise. The output of the multiplexer 204 is coupled to an input of the register 206 for sampling the counter reading 205 in synchronization with the second (or high frequency) clock domain 104.

In one embodiment the synchronization pulse generator 110 comprises a comparator 210 configured to compare the counter reading 205 with the predefined number and generate the subsequent synchronization pulse 118_$n$ (n=2) when the predefined number is equal to the counter reading 204. Alternatively, the synchronization pulse generator 110 can comprise a comparator 210 and a register 212. In that case, the comparator 210 is configured to compare the counter reading 204 with the predefined number (e.g. zero) and generate the subsequent synchronization pulse 118_n (n=2) when the predefined number is equal to the counter reading 204, where the register 212 is configured to delay the subsequent synchronization pulse 118_n (n=2) by one high frequency clock cycle.

As shown in the embodiment of FIG. 8, the synchronization pulse generator 110 and the counter 202 is implemented in the reload counter 111. In addition, the reload counter 111 comprises a register 214 for sampling a reset signal 216 and a or-block 218. An output of the register 214 is coupled to a reset input 194 of the second gray counter 190 and to an input of the or-block 218. A second input of the or-block 218 is coupled to the output of the register 212 of the synchronization pulse generator 110. The output of the or-block 218 is coupled to a control terminal of the multiplexer 204 of the counter 202 such that the multiplexer 204 of the counter 202 is configured to provide at its output the number of clocks in the second (or high frequency) clock domain 116 in response to a synchronization pulse 118_n or in response to the reset signal 216 sampled by the register 214 of the reload counter 111.

FIG. 9 shows a block diagram of the fill level information provider 112 according to an embodiment of the present invention. Or in other words, FIG. 9 depicts an implementation of the first-in-first-out storage 108 fill level detector.

The fill level information provider 112 can comprise a first register 230 for sampling the write pointer value 142 and a second register 232 for sampling the read pointer value 144. Thereby, the fill level information provider 112 in such an embodiment is configured to combine the sampled write pointer value 234 and the sampled read pointer value 236 in order to obtain a fill level value 238 describing the fill level of the first-in-first-out storage 108 and provide the fill level information 124 such that the fill level information represents the fill level value 238.

Alternatively, the fill level information provider 112 comprises a first synchronization cell 238 having the first register 230 and a third register 240, and a second synchronization cell 242 having the second register 232 and a fourth register 244. The first and third register 230 and 240 of the first synchronization cell 238, and the second and fourth register 232 and 244 of the second synchronization cell 242 are clocked with the clock of the first (or low frequency) clock domain 102. In that case, the second synchronization cell 242 is configured to synchronize the read pointer value 144 from the second (or high frequency) clock domain 104 into the first (or low frequency) clock domain 102, thereby delaying the read pointer value 144 by two clock cycles of the first (or low frequency) clock domain 102. The first synchronization cell 238 can delay the write pointer value 142 also by two clock cycles of the first (or low frequency) clock domain 102.

Moreover, in one embodiment the fill level information provider 112 comprises a first gray to binary converter 246 and a second gray to binary converter 248. The first gray to binary converter 246 is configured to convert the sampled gray coded write pointer value 234 into a binary coded write pointer value 250, where the second gray to binary converter 248 is configured to convert the sampled gray coded read pointer value 236 into a binary coded read pointer value 252.

The width of the binary coded write pointer value 250 and the binary coded read pointer value 252 depends on the number of storage cells of the first-in-first-out storage 108. In the case of a first-in-first-out storage 108 with four storage cells 140_0 to 140_3, the binary coded write pointer value 250 and the binary coded read pointer value 252 can have a width of two bits.

Furthermore, the binary coded read pointer value 252 can be subtracted from the binary coded write pointer value 250 by means of an adder 254, thereby providing at the output of the adder 254 the fill level value 238. The fill level value 238 can have also a width of two bits.

Moreover, the fill level information provider 112 can further be configured to sum or average a plurality of fill level values 238 in order to obtain a summed or averaged fill level value 276 describing an average fill level of the first-in-first-out storage 108, and provide the fill level information such the fill level information represents the summed or averaged fill level value 276.

For example, as shown in FIG. 9, four consecutive fill level values 238 can be averaged in order to simplify the synchronization of the fill level information 124 into the first (or low frequency) clock domain 102. This averaging is sufficient for tracking the fill level of the first-in-first-out storage 108 because (in general) the frequency deviations are small compared to the read/write rate of the first-in-first-out storage 108. Hence, the fill level will not change rapidly.

In order to sum a plurality of fill level values 238, the fill level information provider 112 can further comprise a fifth register 260, a sixth register 262, a seventh register 264, a second adder 266, a multiplexer 268 and a counter 270. The counter 270, e.g. a 2-bit counter, can be configured to count in synchronization with the clock of the first (or low frequency) clock domain and provide a counter reading value 272 describing the current counter reading. Furthermore, the counter 270 is configured to provide a control signal 174 when the counter reading is equal to a predefined number (e.g. four). The fifth register 260 is configured to sample the fill level value 238 (e.g. having a width of two bit) present at its input in synchronization with the clock of the first (or low frequency) clock domain 102. Furthermore, an output of the fifth register 260 is coupled to a first input of the multiplexer 268 and to a first input of the adder 266, where the second input of the multiplexer 268 is coupled to an output of the adder 266. Thereby, the adder 266 is configured to add to the fill level value 238 sampled by the fifth register 260 a previous sum of fill level values 278 present at its second input in order to obtain a current sum of fill level values. The multiplexer 268 is configured to provide at its output, based on the control signal 274, either the fill level value 238 as current sum of fill level values or the current sum of fill level values provided by the adder. The output of the multiplexer 268 is coupled to an input of the sixth register 262 that is configured to sample the current sum of fill level values (e.g. having a width of four bits) in synchronization with the clock of the first (or low frequency) clock domain 102. An output of the sixth register 262 is coupled to an input of the seventh register 264 and to the second input of the adder 266. The seventh register 264 is configured to re-sample the current sum of fill level values 278 present at its input in synchronization with the clock of the first (or low frequency) clock domain 102 and in response to the control signal 274 provided by the counter 270 and provide the re-sampled current sum of fill level values as summed fill level value 276. The summed fill level value 276 and the counter reading value 272 provided by the counter 270 is fed back to the calculator 106 by the feedback path 114 as fill level information 124. Note that the above listed and in FIG. 9 shown blocks can be clocked with the clock of the first (or low frequency) clock domain 102.

Figure 10:
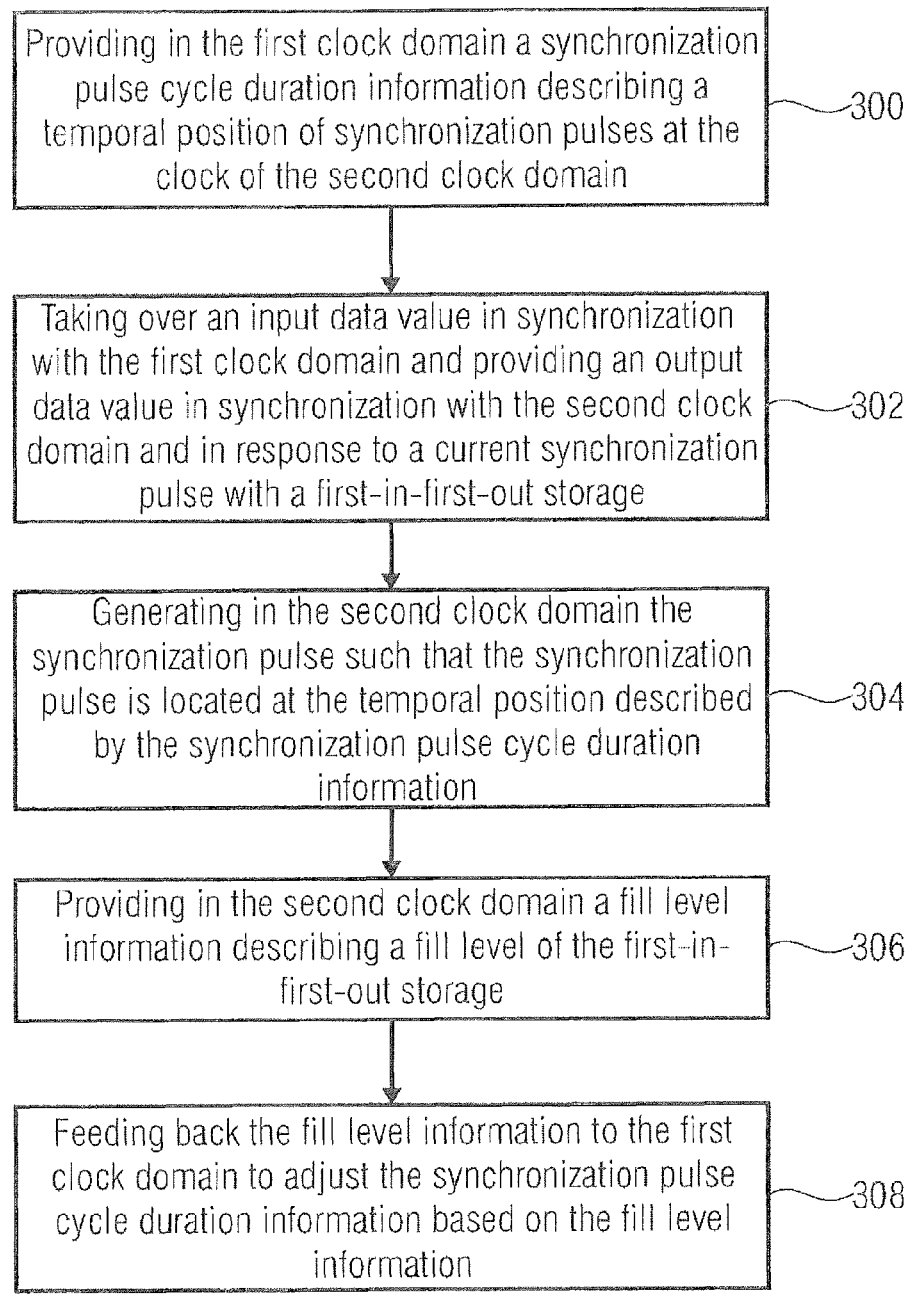
FIG. 10 shows a flow chart of a method for synchronizing a data handover between a first clock domain and a second clock domain according to an embodiment of the present invention.

FIG. 10 shows a flow chart of a method for synchronizing a data handover between a first clock domain and a second clock domain according to an embodiment of the present invention. While the description below describes the method as a series of steps, various steps may be performed in a different order or concurrently with one another. In addition, not all steps may be necessary to accomplish the present invention. In a first step 300, a synchronization pulse cycle duration information describing a temporal position of synchronization pulses at a clock of the second clock domain is provided in the first clock domain. In a second step 302, an input data value is taken over in synchronization with the first clock domain and an output data value is provided in synchronization with the second clock domain and in response to a current synchronization pulse with a first-in-first-out storage. In a third step 304, the synchronization pulse is generated in the second clock domain such that the synchronization pulse is located at the temporal position described by the synchronization pulse cycle duration information. In a fourth step 306, a fill level information describing a fill level of the first-in-first-out storage is provided in the second clock domain. In a fifth step 308, the fill level information is fed back to the first clock domain to adjust the synchronization pulse cycle duration information based on the fill level information.

In some embodiments, the synchronization pulse cycle duration information can be provided such that the synchronization pulse cycle duration information represents, in the form of a coded numeric value, a number of clocks in the second clock domain.

Moreover, the method for synchronizing a data handover between a first clock domain and a second clock domain can further comprise the step of counting the clocks in the second clock domain and providing a counter reading, wherein the synchronization pulse is generated based on the counter reading such that a temporal position of the synchronization pulse is adjusted based on the synchronization pulse cycle duration information, and wherein the counter reading is set to an initial value in response to a generation of the synchronization pulse.

In addition, the method for synchronizing a data handover between a first clock domain and a second clock domain can further comprise the steps of processing an input information such that the input data value is provided in synchronization with the first clock domain for the first-in-first-out storage; receiving the output data value in synchronization with the second clock domain and in response to the synchronization pulse from the first-in-first-out storage; and processing the output data value such that an output information is provided in synchronization with the second clock domain.

Further embodiments of the present invention provide an apparatus for synchronizing a data handover between a first clock domain and a second clock domain. The apparatus comprises a means for calculating, a means for first-in-first-out storing, a means for generating synchronization pulses and a means for providing a fill level information. The means for calculating is clocked with the clock of the first clock domain and configured to provide a synchronization pulse cycle duration information describing a temporal position of synchronization pulses at a clock of the second clock domain. The means for first-in-first-out storing is configured to take over an input data value in synchronization with the first clock domain and provide an output data value in synchronization with the second clock domain and in response to a current synchronization pulse. The means for generating synchronization pulses is clocked with the clock of the second clock domain and configured to generate the subsequent synchronization pulse such that the subsequent synchronization pulse is located at the temporal position described by the synchronization pulse cycle duration information. The means for providing a fill level information is configured to provide a fill level information describing a fill level of the first-in-first-out storage. The means for feeding back is configured to feed back the fill level information to the calculator. Thereby, the means for calculating is configured to adjust the synchronization pulse cycle duration information based on the fill level information.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. An apparatus for synchronizing a data handover between a first clock domain and a second clock domain, the apparatus comprising:
a calculator clocked with the clock cycle of the first clock domain and configured to provide a synchronization pulse cycle duration information describing a temporal position of synchronization pulses at a clock cycle of the second clock domain;
a first-in-first-out storage configured to receive an input data value in synchronization with the first clock domain and further configured to provide an output data value in synchronization with the second clock domain and in response to a current synchronization pulse;
a synchronization pulse generator clocked with the clock cycle of the second clock domain and configured to generate the subsequent synchronization pulse such that the subsequent synchronization pulse is located at the temporal position described by the synchronization pulse cycle duration information;
a fill level information provider configured to provide a fill level information describing a fill level of the first-in-first-out storage; and
a feedback path configured to feed back the fill level information to the calculator;
wherein the calculator is configured to adjust the synchronization pulse cycle duration information based on the fill level information.

2. The apparatus according to claim 1, wherein the first-in-first-out storage is configured to receive the synchronization pulse cycle duration information in synchronization with the first clock domain and provide the synchronization pulse cycle duration information in synchronization with the second clock domain and in response to the current synchronization pulse.

3. The apparatus according to claim 2, wherein the synchronization pulse generator is configured to receive the synchronization pulse cycle duration information from the first-in-first-out storage in synchronization with the second clock domain and in response to the current synchronization pulse.

4. The apparatus according to claim 1, wherein the calculator is configured to provide the synchronization pulse cycle duration information such that the synchronization pulse cycle duration information represents a number of clock cycles in the second clock domain between the current synchronization pulse and the subsequent synchronization pulse.

5. The apparatus according to claim 4, wherein the first-in-first-out storage is configured to receive the synchronization pulse cycle duration information and the input data in one clock cycle of the first clock domain, and provide the synchronization pulse cycle duration information and the output data in one clock cycle of the second clock domain; and
wherein the synchronization pulse cycle duration information describes the number of clocks in the second clock domain for which the output data is valid.

6. The apparatus according to claim 4, further comprising a counter clocked with the clock cycle of the second clock domain and configured to count the clock cycles in the second clock domain and provide a counter reading;
wherein the synchronization pulse generator is configured to generate the subsequent synchronization pulse based on the counter reading such that the subsequent synchronization pulse is located at the temporal position described by the number of clock cycles in the second clock domain that is represented by the synchronization pulse cycle duration information, and wherein the counter reading is set to an initial value in response to the generation of the subsequent synchronization pulse.

7. The apparatus according to claim 6, wherein the apparatus is configured to set the counter reading to the number of clock cycles in the second clock domain represented by the synchronization pulse cycle duration information in response to the current synchronization pulse, and wherein the counter is configured to count down the counter reading from the set counter reading in synchronization with the clock cycle of the second clock domain; and
wherein the synchronization pulse generator is configured to compare the counter reading with a predefined number and generate the subsequent synchronization pulse when the predefined number is equal to the counter reading.

8. The apparatus according to claim 6, wherein the counter is configured to count up the clock cycles in the second clock domain from the set counter reading in synchronization with the clock cycle of the second clock domain; and
wherein the synchronization pulse generator is configured to compare the counter reading with the number of clock cycles in the second clock domain represented by the synchronization pulse cycle duration information and generate the subsequent synchronization pulse when the counter reading is equal to the number of clock cycles in the second clock domain represented by the synchronization pulse cycle duration information.

9. The apparatus according to claim 1, wherein the first-in-first-out storage comprises a plurality of storage cells, wherein the first-in-first-out storage is configured to receive the input data value into a storage cell of the plurality of storage cells indicated by a write pointer value, and wherein the first-in-first-out storage is configured to provide the output data value from another storage cell of the plurality of storage cells indicated by a read pointer value; and
wherein the fill level information provider comprises a first register for sampling the write pointer value and a second register for sampling the read pointer value, wherein the fill level information provider is configured to combine the sampled write pointer value and the sampled read pointer value in order to obtain a fill level value describing the fill level of the first-in-first-out storage and provide the fill level information such that the fill level information represents the fill level value.

10. The apparatus according to claim 9, wherein the fill level information provider is configured to sum or average a plurality of fill level values in order to obtain a summed or averaged fill level value describing an average fill level of the first-in-first-out storage, and to provide the fill level information such that the fill level information represents the summed or averaged fill level value.

11. The apparatus according to claim 1, wherein the clock cycle of the second clock domain is modulated, and wherein the calculator is configured to adjust the synchronization pulse cycle duration information based on modulation data describing the modulation of the clock of the second clock domain.

12. The apparatus according to claim 1, wherein the calculator comprises a controller configured to regulate the synchronization pulse cycle duration information to bring the fill level information towards a predetermined target fill level information.

13. The apparatus according to claim 12, wherein the calculator is configured to combine an output value of the controller with a frequency ratio value describing a frequency ratio between a clock frequency of the second clock domain and a clock frequency of the first clock domain to obtain the synchronization pulse cycle duration information.

14. The apparatus according to claim 1, further comprising:
a first data processor clocked with the clock cycle of the first clock domain and configured to process an input information such that the input data value is provided in synchronization with the first clock domain for the first-in-first-out storage; and
a second data processor locked with the clock cycle of the second clock domain and configured to receive the output data value in synchronization with the second clock domain and in response to the synchronization pulse from the first-in-first-out storage, and further configured to process the output data value such that an output information is provided in synchronization with the second clock domain.

15. An apparatus for synchronizing a data handover between a first clock domain and a second clock domain, the apparatus comprising:
a calculator clocked with the clock cycle of the first clock domain and configured to provide a synchronization pulse cycle duration information describing a temporal position of synchronization pulses at a clock cycle of the second clock domain;
a first-in-first-out storage configured to receive the synchronization pulse cycle duration information and an input data value in synchronization with the first clock domain and further configured to provide the synchronization pulse cycle duration information and an output data value in synchronization with the second clock domain and in response to a current synchronization pulse;
a synchronization pulse generator clocked with the clock cycle of the second clock domain and configured to receive the synchronization pulse cycle duration information from the first-in-first-out storage and generate the subsequent synchronization pulse such that the subsequent synchronization pulse is located at the temporal position described by the synchronization pulse cycle duration information;

a fill level information provider configured to provide a fill level information describing a fill level of the first-in-first-out storage; and
a feedback path configured to feed back the fill level information to the calculator;
wherein the calculator is configured to adjust the synchronization pulse cycle duration information based on the fill level information.

16. The apparatus according to claim 14, wherein the calculator is configured to provide the synchronization pulse cycle duration information such that the synchronization pulse cycle duration information represents a number of clock cycles in the second clock domain between the current synchronization pulse and the subsequent synchronization pulse.

17. The apparatus according to claim 15, further comprising a counter clocked with the clock cycle of the second clock domain and configured to count the clock cycles in the second clock domain and to provide a counter reading;
wherein the synchronization pulse generator is configured to generate the subsequent synchronization pulse based on the counter reading such that the subsequent synchronization pulse is located at the temporal position described by the number of clock cycles in the second clock domain that is represented by the synchronization pulse cycle duration information, and wherein the counter reading is set to an initial value in response to the generation of the subsequent synchronization pulse.

18. The apparatus according to claim 14, wherein the calculator comprises a controller configured to regulate the synchronization pulse cycle duration information to bring the fill level information towards a predetermined target fill level information.

19. The apparatus according to claim 18, wherein the calculator is configured to combine an output value of the controller with a frequency ratio value describing a frequency ratio between a clock frequency of the second clock domain and a clock frequency of the first clock domain to obtain the synchronization pulse cycle duration information.

20. The apparatus according to claim 15, further comprising:
a first data processor clocked with the clock cycle of the first clock domain and configured to process an input information such that the input data value is provided in synchronization with the first clock domain for the first-in-first-out storage; and
a second data processor clocked with the clock cycle of the second clock domain and configured to receive the output data value in synchronization with the second clock domain and in response to the synchronization pulse from the first-in-first-out storage, and further configured to process the output data value such that an output information is provided in synchronization with the second clock domain.

21. An apparatus for synchronizing a data handover between a first clock domain and a second clock domain, the apparatus comprising:
means for calculating clocked with the clock cycle of the first clock domain and configured to provide a synchronization pulse cycle duration information describing a temporal position of synchronization pulses at a clock cycle of the second clock domain;
means for first-in-first-out storing configured to receive an input data value in synchronization with the first clock domain and further configured to provide an output data value in synchronization with the second clock domain and in response to a current synchronization pulse;

means for generating synchronization pulses clocked with the clock cycle of the second clock domain and configured to generate the subsequent synchronization pulse such that the subsequent synchronization pulse is located at the temporal position described by the synchronization pulse cycle duration information;

means for providing a fill level information configured to provide a fill level information describing a fill level of the first-in-first-out storage; and means for feeding back the fill level information to the calculator;

wherein the means for calculating is configured to adjust the synchronization pulse cycle duration information based on the fill level information.

22. A method for synchronizing a data handover between a first clock domain and a second clock domain, the method comprising:

providing in the first clock domain a synchronization pulse cycle duration information describing a temporal position of synchronization pulses at a clock cycle of the second clock domain;

receiving an input data value in synchronization with the first clock domain;

providing an output data value in synchronization with the second clock domain and in response to a current synchronization pulse with a first-in-first-out storage;

generating in the second clock domain the synchronization pulse such that the synchronization pulse is located at the temporal position described by the synchronization pulse cycle duration information;

providing in the second clock domain a fill level information describing a fill level of the first-in-first-out storage; and feeding back the fill level information to the first clock domain to adjust the synchronization pulse cycle duration information based on the fill level information.

23. The method according to claim 22, wherein the synchronization pulse cycle duration information is provided such that the synchronization pulse cycle duration information represents, in the form of a coded numeric value, a number of clock cycles in the second clock domain.

24. The method according to claim 23, comprising counting the clock cycles of the second clock domain and providing a counter reading, wherein the synchronization pulse is generated based on the counter reading such that a temporal position of the synchronization pulse is adjusted based on the synchronization pulse cycle duration information, and wherein the counter reading is set to an initial value in response to a generation of the synchronization pulse.

25. The method according to claim 22, further comprising:

processing an input information such that the input data value is provided in synchronization with the first clock domain for the first-in-first-out storage;

receiving the output data value in synchronization with the second clock domain and in response to the synchronization pulse from the first-in-first-out storage; and processing the output data value such that an output information is provided in synchronization with the second clock domain.

26. A computer program having a program code stored on a non-transitory storage medium, for performing a method for synchronizing a data handover between a first clock domain and a second clock domain when the computer program is running on a computer or microprocessor, wherein the method comprises:

providing in the first clock domain a synchronization pulse cycle duration information describing a temporal position of synchronization pulses at a clock cycle of the second clock domain;

receiving an input data value in synchronization with the first clock domain;

providing an output data value in synchronization with the second clock domain and in response to a current synchronization pulse with a first-in-first-out storage;

generating in the second clock domain the synchronization pulse such that the synchronization pulse is located at the temporal position described by the synchronization pulse cycle duration information;

providing in the second clock domain a fill level information describing a fill level of the first-in-first-out storage; and feeding back the fill level information to the first clock domain to adjust the synchronization pulse cycle duration information based on the fill level information.

* * * * *